Figure 1:
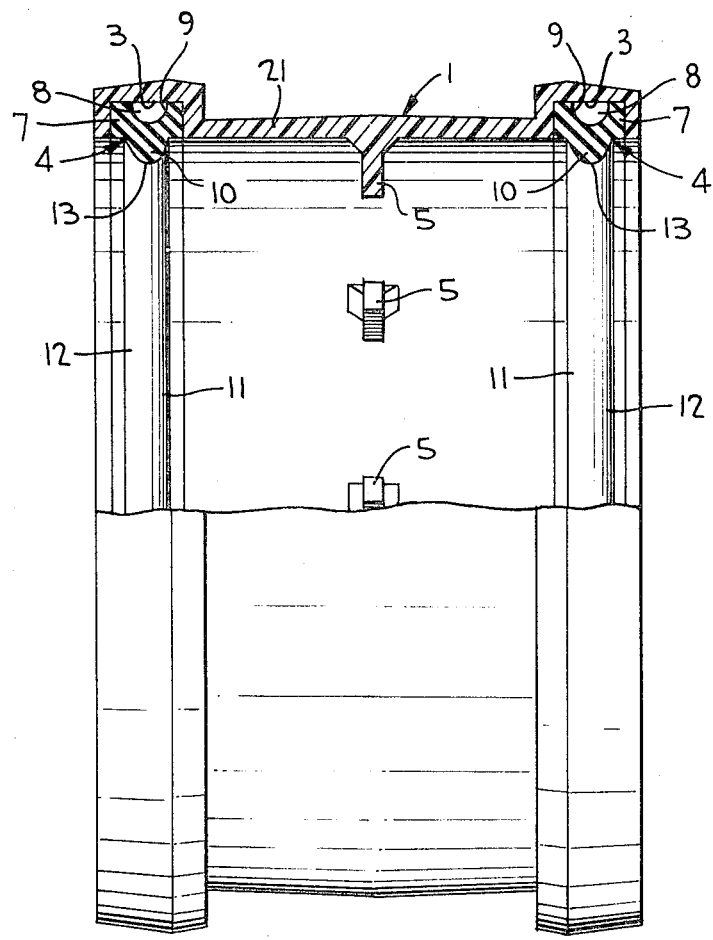

United States Patent

[11] 3,592,491

| [72] | Inventor | John Benjamin Glover<br>Hazlehead, near Sheffield, England |
|---|---|---|
| [21] | Appl. No. | 720,083 |
| [22] | Filed | Apr. 10, 1968 |
| [45] | Patented | July 13, 1971 |
| [73] | Assignee | The Hepworth Iron Company Limited |

[54] PIPE COUPLINGS
4 Claims, 2 Drawing Figs.

[52] U.S. Cl.............................................. 285/230,
285/235, 285/345, 277/206
[51] Int. Cl............................................... F16l 21/02
[50] Field of Search.......................................... 285/231,
230, 235, 423, 345, 110, 350, DIG. 11; 277/206, 207

[56] References Cited
UNITED STATES PATENTS

| 3,048,415 | 8/1962 | Shook | 277/207 (A) |
| 3,390,890 | 7/1968 | Kurtz | 277/207 (A) |
| 1,924,020 | 8/1933 | Bihet | 285/345 |
| 2,146,641 | 2/1939 | McWane | 285/231 X |
| 2,451,070 | 10/1948 | Chamberlain | 285/231 X |
| 2,953,398 | 9/1960 | Haugen et al. | 285/231 X |
| 3,175,833 | 3/1965 | Morse | 277/206 X |
| 3,219,354 | 11/1965 | Kazienko | 277/206 X |
| 3,228,705 | 1/1966 | Underwood | 277/206 |
| 3,366,392 | 1/1968 | Kennel | 277/206 X |
| 3,368,830 | 2/1968 | French | 285/235 X |

FOREIGN PATENTS

| 660,631 | 4/1963 | Canada | 285/231 |

Primary Examiner—Thomas F. Callaghan
Attorney—Watson, Cole, Grindle and Watson

ABSTRACT: A synthetic plastic coupling sleeve for clayware, pitch-fibre or asbestos-cement plain-end pipes has a corrugation at each end forming inwardly facing recesses for sealing rings, each recess having a rectangular cross section, and each sealing ring comprising a body portion filling its recess except for a portion corresponding to an annular groove of semicircular cross section in the sealing ring midway between the ends of the recess and adjacent the wall of the recess, and an annular sealing head having at least the side facing the outer end of the recess—but preferably both sides of the head—bevelled and spaced from the outer side of the body portion, the volume of the sealing head being appreciably greater than the volume of the groove.

PATENTED JUL 13 1971

3,592,491

INVENTOR,
JOHN BENJAMIN GLOVER
BY
Watson, Cole, Grindle & Watson
ATTORNEYS

PIPE COUPLINGS

This invention relates to pipe couplings for plain-end pipes of clayware, pitch-fibre or asbestos-cement, such as are used for sewers, drains and cable conduit, and more particularly to pipe couplings of the type comprising a sleeve of resilient synthetic plastic material having a wall corrugated at each end of a cylindrical portion to define inwardly facing annular recesses for resilient sealing rings of radial thickness exceeding the depth of the recesses, the sleeve also usually being provided with a plurality of thin integral internal projections or a flange or being otherwise constricted at its midlength to less than the outside diameter of the pipes, to centralize the sleeve on a pair of adjacent pipe-ends by appropriate location of the sleeve on the pipe-end to which it is first applied.

Using a toroidal or simple standard "O-ring" type of sealing ring or any other sealing ring not extending to the limits of the recess, there is a tendency for the sealing ring to be dislodged from the recess during insertion of a pipe-end, either by an inserted pipe-end of less than nominal diameter rolling the ring over the inner edge of the recess, between which and the peripheral surface of the pipe-end there will be an appreciable annular gap, or by an inserted pipe end of greater than nominal diameter squeezing the ring out of the recess through the gap between the end face of the pipe and the inner edge of the recess. The latter condition is aggravated by an absolutely square pipe-end, because the more nearly the initial thrust of the pipe-end on the sealing ring approaches the perpendicular to the first-contacted surface of the sealing ring the greater is also the gap through which the ring can be squeezed. On the other hand, while a slight taper on a pipe-end is usual to avoid aggravating this possibility and to assist in the proper compression of the sealing ring by a more gradual application of the considerable pressure required to deform the section of the sealing ring, it increases the probability of the sealing ring being rolled over the inner edge of the recess by increasing the annular gap into which the ring can be rolled, especially if the pipe-end is not coaxially aligned with the coupling sleeve during insertion because this results in a widening of the gap at one side.

While a flattening of the sealing ring on its outside, i.e., to contact the back of the recess and making the sealing ring a D-section, lessens the likelihood of it being dislodged from the recess, it results in there being less space in the recess for the accommodation of sealing ring material displaced in the axial direction in consequence of compression of the ring in the radial direction by an inserted pipe-end, which places a limitation on the tolerance on nominal diameter of the inserted pipe-end, even allowing for some slight stretching of the sleeve.

It is also known to form the sealing ring with an inwardly facing annular recess for a locking ring to prevent the sealing ring from being dislodged, but the need for manufacture and assembly of such extra part can prove both costly and inconvenient, quite apart from adding to the stiffness of the coupling and reducing the free space for accommodation of displaced sealing ring material.

The object of the invention is to provide a pipe coupling of the type referred to with sealing rings which are not liable to be dislodged from their recesses even by absolutely square pipe-ends, but which in fact are forced into better gripping contact with their recesses by the initial compression caused by first contact with inserted pipe-ends and therefore suitable for use with cut pipe-lengths as well as with pipe-lengths with smoothly finished ends, and capable of affording good sealing over an appreciable range of tolerance on nominal pipe diameter.

According to the present invention, a pipe coupling of the type referred to is characterized in that each sealing ring recess has a rectangular cross section, and in that each sealing ring comprises a body portion formed initially to fill its recess except for a portion corresponding to an annular groove of semicircular cross section in the sealing ring midway between the ends of the recess and adjacent the wall of the recess, and an annular sealing head having at least the side facing the outer end of the recess bevelled and spaced from the outer side of the body portion, the volume of the sealing head being appreciably greater than the volume of the groove.

When either sealing ring is compressed upon insertion of a pipe-end into that end of the sleeve, the divided sides of the body portion are pressed against the ends of the recess, thus adding to the grip already afforded by the close fit of the body portion in the recess, to resist any tendency for the sealing ring to be dislodged. If the ring tends to be rolled towards the inner end of its recess by an inserted pipe-end, especially an absolutely square one of greater than nominal outside diameter, the shoulder between the outer side of the body of the sealing ring and the outer side of the sealing head soon comes into contact with the pipe-end, to prevent further rolling and ensure good sealing contact with the pipe-end.

Some of the sealing ring material displaced from the heads by inserted pipe-ends will be accommodated with ease by the grooves, especially with pipe-ends of the larger diameters in the range of tolerances on nominal diameter—but will not necessarily fill them—but as the volume of each sealing head exceeds the volume of the groove, the sealing heads will be distorted to some extent in the axial direction, particularly inwardly of the sleeve, thus ensuring good sealing contact with the pipe ends. Slight stretching of the sleeve may also take place, to accommodate pipe-ends of particularly large diameters, possibly even before the grooves in the bodies of the sealing rings have been filled up.

The inner side of each sealing head is preferably similarly bevelled and spaced from the inner side of the body portion, so that the sealing rings can be fitted in the recesses either way round, and the oppositely bevelled sides are preferably blended into each other by a rounded inner periphery.

Although each recess has been defined as having a rectangular cross section, each end of each recess may blend by a radius into the wall of the recess, the bodies of the sealing rings being bevelled or rounded to correspond when fitted. Likewise, although the groove in each sealing ring has been defined as having a semicircular cross section, this section may be somewhat flatter or semielliptical, as long as the thrust of a pipe-end on the sealing head results in the divided sides of the body portion being pressed against the ends of the recess.

The sealing rings may be formed initially with a slightly greater overall axial width than the recesses, so that the slight axial compression of the rings—accommodated by a slight closing in of the sides of the grooves—upon fitting in the recesses affords a good initial grip.

Figure 2:
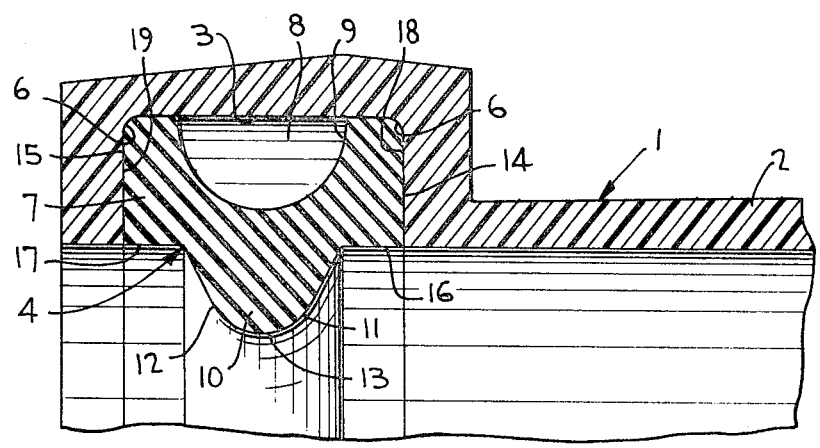

One embodiment of the invention will now be described, by way of example only, with reference to the accompanying drawings, in which FIG. 1 is a half-sectional elevation of a coupling sleeve according to the invention; and FIG. 2 is an enlargement of the left-hand upper corner of FIG. 1 showing the section of the sealing rings.

A sleeve coupling 1 of resilient synthetic plastic material has its wall corrugated at each end of a cylindrical portion 2 to define inwardly facing annular recesses 3 for rubber sealing rings 4 of overall radial thickness exceeding the depth of the recesses, the sleeve also being provided with a plurality of thin integral internal projections 5 at its midlength, for centralizing the sleeve on a pair of pipe-ends (not shown) by appropriate location of the sleeve on the pipe-end to which it is first applied.

Each sealing ring recess 3 is of rectangular section except for radiused corners 6, and each sealing ring 4 comprises a body portion 7 formed initially to fill its recess except for a portion 8 corresponding to a central annular groove 9 of semicircular cross section in the sealing ring and an annular sealing head 10 having equally and oppositely bevelled inner and outer sides 11, 12 blended into each other by a rounded inner periphery 13 and spaced from the respective sides 14, 15 of the body portion by shoulders 16, 17 respectively.

When a pipe-end is inserted into either end of the sleeve 1, the sealing ring 4 is compressed and the divided sides 14, 15 of the body portion 7 are pressed against the ends 18, 19 of the recess 3, thus adding to the grip already afforded by the close fit of the body portion in the recess, to resist any tendency for the sealing ring to be dislodged. If the sealing ring tends to be rolled towards the inner end 18 of its recess, the shoulder 17 soon comes into contact with the inserted pipe-end, to prevent further rolling and ensure good sealing contact. Some of the sealing ring material displaced from the sealing head 10 will be accommodated with ease by the groove 9—but will not necessarily fill it—but as the volume of each sealing head exceeds the volume of the groove, the sealing head will be distorted to some extent in the axial direction, particularly inwardly of the sleeve, thus ensuring good sealing contact with the pipe end. Slight stretching of the sleeve 1 may also take place, to accommodate pipe-ends of particularly large diameter, possibly even before the groove 9 has been filled up.

The flexibility of the cylindrical portion 2 of the sleeve 1 enables it to distort in the event of relative lateral or angular displacement of adjacent pipe-ends, but the greater rigidity of the corrugated recess-defining portions inhibits any tendency for the recesses 3 to distort sufficiently to impair the sealing contact between the compressed sealing rings 4 and the sleeve and the pipe-ends at any point round the circumference of the coupling. The resilient flexibility, however, does permit the corrugated ends of the sleeve to yield to the precise profiles of the respective pipe-ends to which they are fitted, which profiles may be oval and/or include localized irregularity of surface or profile. Thus, the coupling is in effect a pair of substantially rigid housings for the sealing rings—but with slight resilience to avoid the sealing rings having to accommodate ovality and the like—connected together by a flexible sleeve.

Suitable materials for the sleeve are modified or unmodified "rigid" polyvinyl chloride, polycarbonate, polyacetal, acrylonitrile butadiene styrene, and propylene, and a suitable material for the sealing rings in natural or synthetic rubber, e.g., butyl rubber, or a like elastomeric material.

What I claim Is:

1. A pipe coupling comprising a sleeve of resilient synthetic plastic material having a wall corrugated at each end of a cylindrical portion to define inwardly facing annular recesses for resilient sealing rings of radial thickness exceeding the depth of the recesses, characterized in that the recess at each end of said sleeve has a rectangular cross section, and in that each sealing ring comprises a body portion formed initially to fill its recess so as to afford a close fit of said body portion in the recess except for a portion corresponding to an annular groove of semicircular cross section in the sealing ring midway between the ends of the recess and adjacent the bottom wall of the recess, and an annular sealing head having at least the side facing the outer end of the recess bevelled and spaced from the outer side of the body portion, the volume of the sealing head being appreciably greater than the volume of the groove whereby, upon insertion of a pipe-end into one end of said sleeve, the sides of said body portion are further pressed against the ends of one of the recesses to resist any tendency for the sealing ring to be dislodged, and said sealing head being distorted inwardly of the sleeve for insuring good sealing contact with the pipe-end.

2. A pipe coupling as in claim 1, wherein the inner side of each sealing head is similarly bevelled and spaced from the inner side of the body portion, and wherein the oppositely bevelled sides are blended into each other by a rounded inner periphery.

3. A pipe coupling as in claim 1, wherein each end of each recess blends by a radius into the wall of the recess, the bodies of the sealing rings being bevelled or rounded to correspond when fitted.

4. A pipe coupling as in claim 1, wherein the sealing rings are formed initially with a slightly greater overall axial width than the recesses.